United States Patent [19]

Trager

[11] Patent Number: 4,853,807
[45] Date of Patent: Aug. 1, 1989

[54] ATTACHABLE HARD-DISK DRIVE AND HOUSING THEREFOR

[76] Inventor: Dennis Trager, 542 Marine World Pkwy., #4203, Redwood City, Calif. 94065

[21] Appl. No.: 82,639

[22] Filed: Aug. 7, 1987

[51] Int. Cl.$^4$ ............................................. G11B 5/012
[52] U.S. Cl. .................................. 360/97.01; 360/137
[58] Field of Search ..................................... 360/97–99, 360/137; 361/383, 384, 390; 312/208, 210; 364/708; D14/102, 106, 107, 108

[56] References Cited

U.S. PATENT DOCUMENTS

| | | | |
|---|---|---|---|
| 3,521,010 | 7/1970 | Sato | 360/137 |
| 4,479,198 | 10/1984 | Romano et al. | 364/708 |
| 4,669,053 | 5/1987 | Krenz | 364/708 |
| 4,717,982 | 1/1988 | Toreson et al. | 364/708 |

OTHER PUBLICATIONS

IBM Technical Disclosure Bulletin, vol. 28 No. 7 Dec. 1985 Industrial Personal Computer For Class "c" Industrial Environment.

Primary Examiner—Robert S. Tupper
Assistant Examiner—Andrew L. Sniezek
Attorney, Agent, or Firm—Burns, Doane, Swecker & Mathis

[57] ABSTRACT

A hard-disk drive includes a housing having a wall contoured to fit vertically flush against the rear wall of a cabinet of a display screen for a personal computer. A hard-disk drive unit is mounted within the housing such that the storage disk within the drive unit is oriented generally parallel to the contoured wall. Vents are formed through the housing to permit air to circulate past the drive unit.

8 Claims, 2 Drawing Sheets

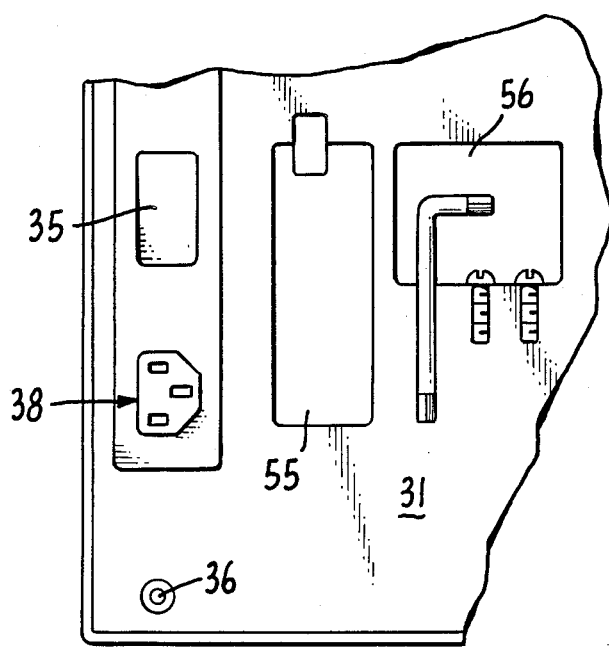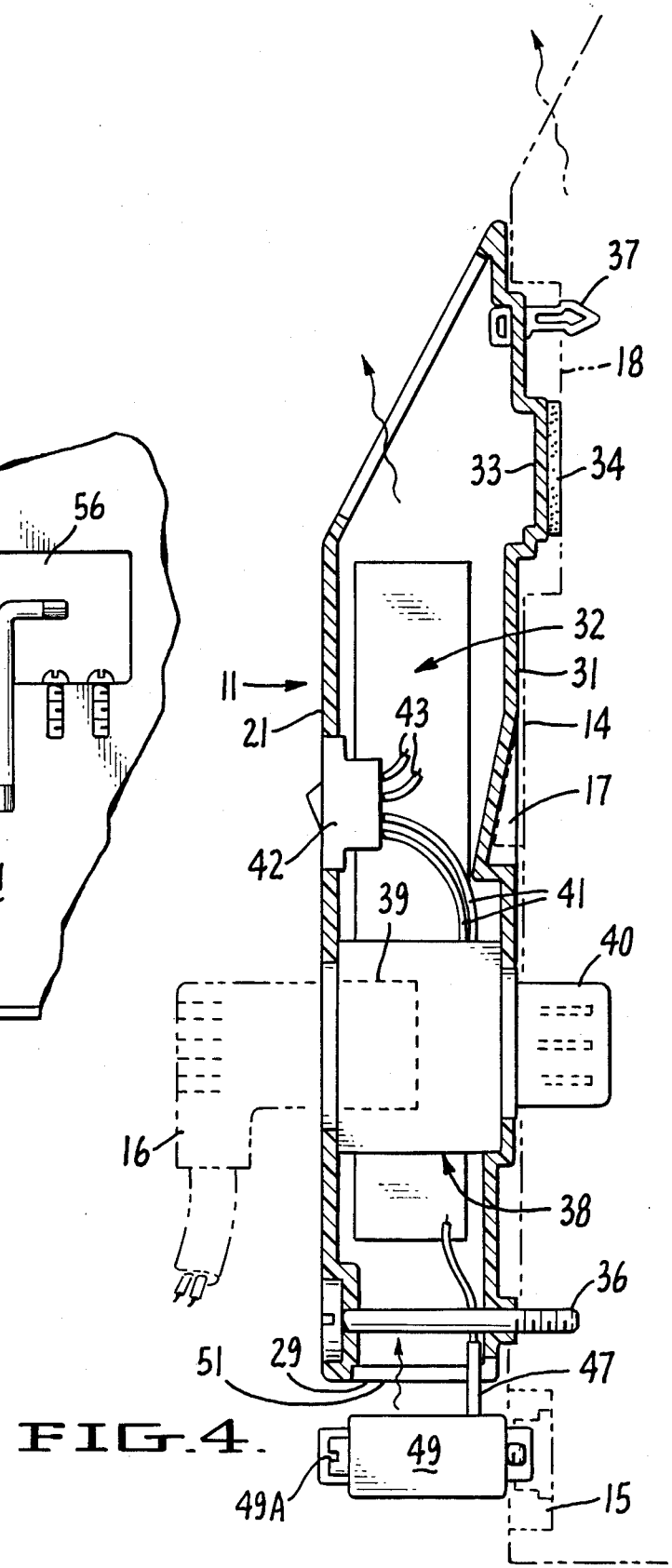

ATTACHABLE HARD-DISK DRIVE AND HOUSING THEREFOR

BACKGROUND OF THE INVENTION

1. Field of the Invention

The present invention generally relates to hard-disk drives for personal computers (i.e, microcomputers) and, more particularly, to housings for hard-disk drives that are externally connected to personal computers.

2. State of the Art

Personal computers (PC's) usually have disk drive units employing flexible or "floppy" magnetic disks for mass data storage. The primary advantage of floppy disks is that they can be easily removed from and replaced in drive units. The disadvantage of floppy disks is that their data storage capacity is relatively limited; for example, the typical capacity of a floppy disk is about 800,000 bytes of encoded binary information. An alternative to floppy disk is rigid or "hard" disks. By way of contrast to floppy disks, hard disks can store 20 megabytes or more of binary information, but are generally not removable from their drive units.

Many PC's are sold with floppy disk drives as "original equipment", but include appropriate circuitry and connectors to receive an externally connected hard disk drive if a user needs increased data storage capacity. A disadvantage of externally connecting a hard disk drive to a PC is that the drive occupies desk space that may be needed for other purposes. To alleviate this problem, some users mount their PC atop hard-disk drive units. Such a solution, however, is not entirely satisfactory because operation of a disk drive generates heat that may detrimentally affect a PC mounted above it. The heating problems may exist even when disk drives are equipped with cooling fans, and noise from the fans may be annoying.

OBJECTS AND SUMMARY OF THE PRESENT INVENTION

A primary object invention of the present invention is to provide an externally-mounted hard-disk drive for personal computers.

More particularly, an object of the present invention is to provide a hard-disk drive for use with a microcomputer having a display screen cabinet with a generally vertically-disposed back wall on which the hard-disk drive can be mounted.

In accordance with the preceding, the present invention provides a hard-disk drive generally comprising: a housing having a wall contoured to mate generally flush in vertical orientation against the rear wall of a display screen cabinet of a personal computer, a hard-disk drive unit mounted in the housing with the plane of its storage disk generally parallel to the contoured wall, vents formed in the housing to permit circulation of cooling air through the housing, and means to connect the housing to the cabinet.

In one preferred embodiment, the hard-disk drive further includes a connector attached to the housing to receive a main power cord for the personal computer and to provide electrical power to the diskdrive unit. The connector extends through the housing and has a protruding end to engage a power cord connector on the cabinet of the personal computer. Also in the preferred embodiment, the contoured wall receives a power switch connected to the rear wall of the personal computer cabinet and holds the switch in the "on" position.

The foregoing and other aspects and advantages of the present invention can be readily ascertained by reference to the following description and attached drawings which illustrate the preferred embodiment.

IN THE DRAWINGS

Figure 2:
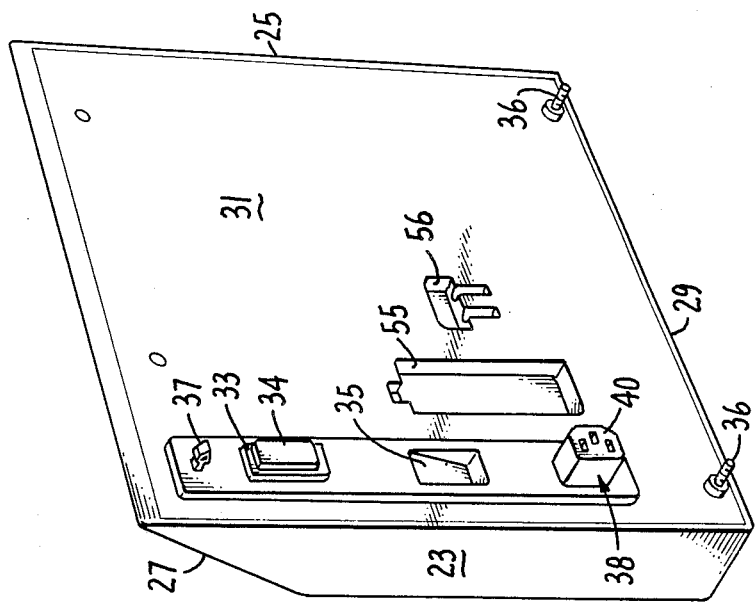
FIG. 2 is a pictorial view of the harddisk drive of FIG. 1 showing the side which attaches to the display screen cabinet.

FIG. 3 is a fragmentary view, drawn to an enlarged scale for purposes of clarity, of a portion of the hard-disk drive of FIG. 2 showing an optional configuration in which is mounted screws and a tool for removing the screws; and FIG. 4 is a side sectional view of the hard-disk drive of FIG. 2 taken along the line 4—4 for viewing in the direction of the arrows, and showing the drive attached to the cabinet of a personal computer display screen.

DETAILED DESCRIPTION OF THE PREFERRED EMBODIMENT

Figure 1:
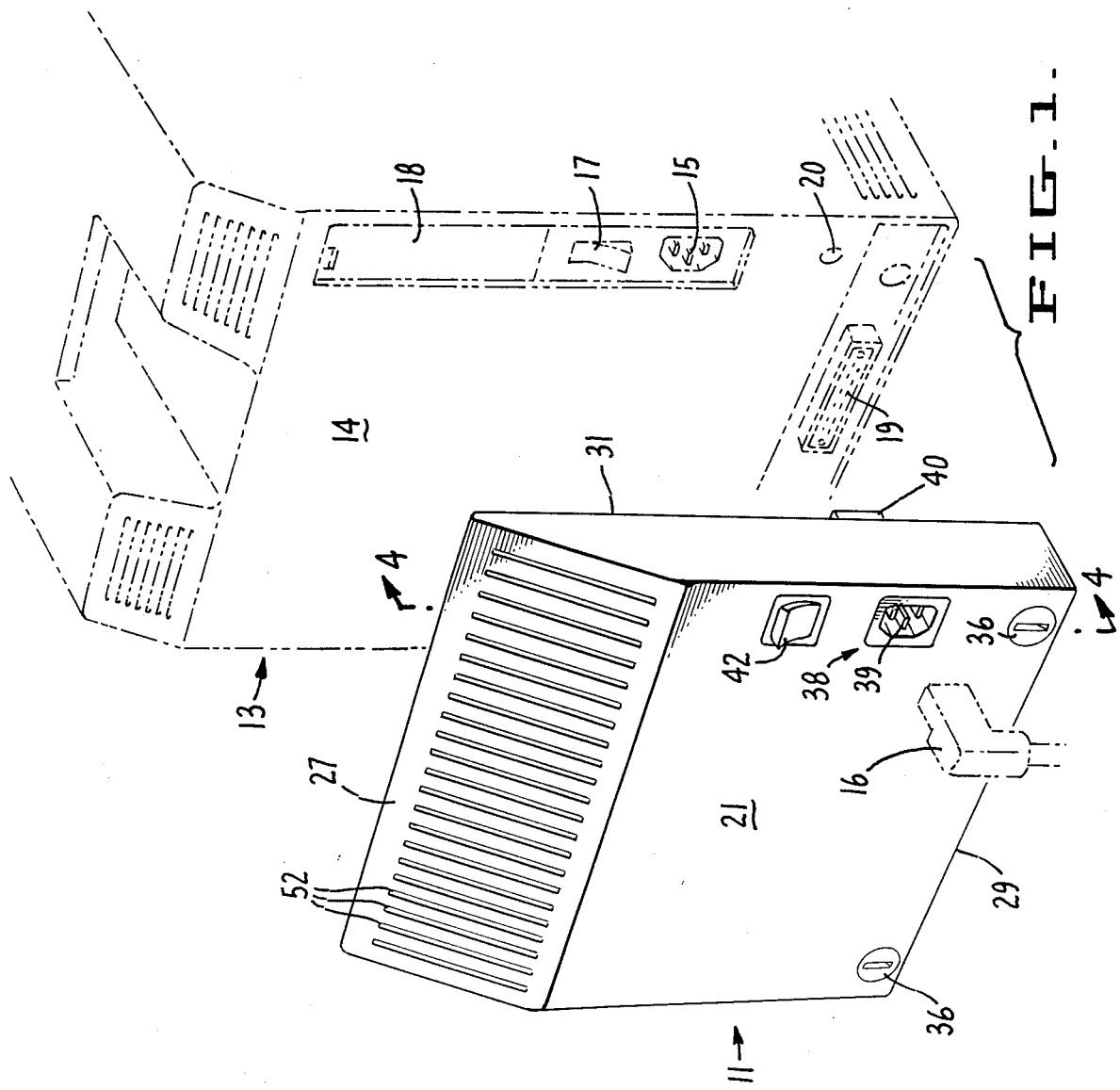
FIG. 1 is a pictorial view of a hard-disk drive according to the present invention located for attachment to a cabinet of a personal computer display screen.

FIG. 1 shows a housing, generally indicated by the number 11, for a hard-disk drive unit for a personal computer. The dashed lines in FIG. 1 generally indicate a cabinet 13 for the display screen of a personal computer as viewed from the rear. Specifically, the illustrated cabinet is for the Macintosh Plus microcomputer manufactured by Apple Computer Co., Inc., of Cupertino, CA. It may be noted that, in the Macintosh Plus microcomputer, the central processing unit of the microprocessor is integrated with the display terminal (i.e., is in the same cabinet).

In the illustrated embodiment of cabinet 13, the rear wall 14 includes a receptacle 15 for receiving a main power cord 16, a toggle-type power supply switch 17, and a door 18 behind which is a compartment for receiving batteries for powering the internal clock of the computer.

It may be noted in FIG. 1 that an aperture 20 is located in the lower right corner of rear wall 14. The purpose of aperture 20 is to receive a screw to connect rear wall 14 to the chassis of the computer. It should be understood that a similar aperture is located at the lower left corner of rear wall 14.

As shown in FIGS. 1 and 2, disk-drive housing 11 generally includes a back wall 21, a pair of sidewalls 23 and 25, top and bottom walls 27 and 29, and a front wall 31. In practice, the walls of housing 11 are dimensioned such that housing 11 has sufficient large volume to contain a so-called "three and one-half inch" disk drive generally designated by number 32. Typically, drive 32 has a surface area of about twenty-four square inches and a height less than about one and one-half inches. For housing such a drive, front wall 31 is about nine inches square, and sidewalls 23 and 25 extend about 1.5 inches from the front wall. Larger disk drives, such as five inch drives, can be accommodated by increasing the depth of housing 11 (i.e., by increasing the extent of sidewalls 23 and 25 and top and bottom walls 27 and 29).

It should be appreciated that FIG. 1 shows disk drive housing 11 disconnected from cabinet 13 whereas FIG. 4 shows housing 11 mounted to cabinet 13 with the rear cabinet wall 14 flush against the front housing wall 31. To provide such mounting, the contours of housing wall 31 must generally match rear cabinet wall 14. Thus, for example, the housing wall 31 has a generally planer configuration with a recess 35 for receiving main power switch 17 on cabinet 13. In practice, recess 35 has a generally triangular shape such that power-switch 17 is received in the recess only in its "on" position.

As shown in FIGS. 1-4, apertures are formed near the lower right and left corners of housing 11 in registry with the apertures 20 in rear wall 14 of cabinet 13, and threaded fasteners 36 are fitted through those apertures to connect housing 11 to rear wall 14 of cabinet 13.

In the case of the Macintosh Plus microcomputer, battery compartment door 18 has a detent to engage a catch in the battery compartment. In FIG. 4, it should be understood that battery compartment door 18 has been removed and that a flexible detent member 37 is attached to wall 31 of housing 11 to engage the catch in the battery compartment. Thus, housing 11 is connected to cabinet 13 at three points as defined by the two threaded fasteners 36 and by detent member 37.

As best shown in FIGS. 2 and 4, wall 31 includes a generally rectangular protruding portion that is positioned to extend into the battery compartment behind door 18 in the rear wall 14 of cabinet 13. In practice, the rectangular protruding portion is sufficiently large to retain batteries within the battery compartment.

Referring now to FIGS. 1-4, there will be described an electrical connector, generally designated by the number 38 attached to housing 11 to receive power cord 16. The purpose of connector 38 is to provide electrical power to the display screen within cabinet 13 as well as to the disk-drive unit 32 within housing 11. In the embodiment shown, electrical connector 38 extends between walls 31 and 21 of housing 11. Also, in the illustrated embodiment, connector 38 includes a receptacle 39 at wall 21 to receive power cord 17 and includes a male-type connector 40 that protrudes from wall 31 for insertion into connector 15 on cabinet 13.

As shown in FIG. 4, wires 41 lead from connector 38 to a switch 42 mounted on wall 21 of housing 11. Also, at least two wires 43 lead from switch 42 to supply power to disk drive unit 32 within housing 11. Generally speaking, switch 42 controls the flow of electrical power through connector 38. In its "on" position, switch 42 allows current to flow through connector 38 to power disk-drive unit 32 and, also, to power the host computer within cabinet 13. In its "off" position, the flow of power is interrupted; thus, switch 41 functionally replaces switch 17.

As also shown in FIG. 4, a ribbon cable 47 extends from disk-drive unit 32 to a connector 49 to communicate data and control signals to the computer within cabinet 13. In the preferred embodiment, ribbon cable 47 is attached at an intermediate location on connector 49, and connector 49 has dual connector faces to allow connection of other cables so that other disk-drive units can be "daisy chained" with unit 32; that is, connector 49 includes a receptacle end 49A to receive another cable connector.

As further shown in FIG. 4 as well as FIG. 1, air circulates through housing 11 to cool disk drive unit 32. In the preferred embodiment, the cooling is achieved convectively (i.e., without a fan). Convective flow through the housing is indicated schematically by the arrows in FIG. 4. To accommodate the convective flow of cooling air, vent openings 51 are formed in bottom wall 29 of housing 11 and vent openings 52 are formed in top wall 27. In practice, such convective ventilation eliminates the need for a fan to cool the disk-drive unit 32 while minimizing heating of cabinet 13.

As best shown in FIG. 3, wall 31 may include recesses 55 and 56. These recesses are provided for purposes of user convenience, but are not functionally necessary. Recesses 55, for example, can be used to store battery compartment door 18. Recess 56 can be used to store screws removed from apertures 20 in cabinet 13 as well as to store a screw-removal tool.

Although the present invention has been described with particular reference to the preferred embodiment, such disclosure should not be interpreted as limiting. Various alterations and modifications will no doubt become apparent to those skilled in the art after having read the preceding disclosure.

What is claimed is:

1. An attachable hard-disk drive for a personal computer having a display screen, a cabinet with a rear wall having a power supply switch, a power connector, a main power cord, and a battery compartment, the hard-disk drive comprising:

(a) a housing having a plurality of walls, one of which is contoured to fit generally flush in vertical orientation against the rear wall of a personal computer, said contoured wall being structurally complementary in configuration to the rear wall of such a personal computer, said contoured wall having projections and detents that substantially mate with the surface contours of such a rear wall, the remainder of the walls of the housing forming an extension of the cabinet of such a personal computer;

(b) a hard-disk drive unit mounted within the housing, said hard-disk drive unit having a storage disk, the plane of the storage disk oriented generally parallel to said one wall;

(c) vent means formed through at least one other wall of said housing to permit air to circulate past the disk drive unit;

(d) means to connect the housing to the rear wall of a personal computer;

(e) connector means attached to said housing to receive the main power cord for a personal computer and to conduct power through the housing to the power connector of such a personal computer to which the hard-disk drive may be attached, said connector means electrically interconnected to the disk drive unit within the housing;

(f) a power switch mounted on the outside of said housing and electrically connected to said connector means to control power to such a personal computer; and (g) a connector to communicate data and control signals to a personal computer, said connector attached to said housing and said disk-drive unit within the housing.

2. A hard-disk drive according to claim 1 wherein said connector means extends through the housing and has a protruding end to engage the power connector on the cabinet of a personal computer to which the hard-disk drive may be attached.

3. A hard-disk drive according to claim 2 wherein said one wall is contoured to receive a power supply switch mounted on the rear wall of a cabinet of a personal computer to which the hard-disk drive may be attached.

4. A hard-disk drive according to claim 3 wherein said one wall is contoured to hold a switch of a personal computer in the "on" position.

5. A hard-disk drive according to claim 4 wherein said contour is an indentation which has a generally triangular shape.

6. A hard-disk drive according to claim 1 wherein said one wall includes a generally rectangular protruding portion that is positioned to extend into the battery compartment in the rear wall of a cabinet of a personal computer to which the hard-disk drive may be attached.

7. A hard-disk drive according to claim 6 wherein said rectangular protruding portion is sufficiently large to retain batteries with a battery compartment of a personal computer.

8. A hard-disk drive according to claim 7 wherein said one wall has an indentation formed therein for holding a cover for the battery compartment of a personal computer.

* * * * *

UNITED STATES PATENT AND TRADEMARK OFFICE
CERTIFICATE OF CORRECTION

PATENT NO. : 4,853,807
DATED : August 1, 1989
INVENTOR(S) : Dennis Trager

It is certified that error appears in the above-identified patent and that said Letters Patent is hereby corrected as shown below:

Column 1, line 20, delete "disk" and insert --disks-- therefor.

Column 1, line 42, delete "invention", first occurrence.

Column 1, line 63, delete "diskdrive" and insert -- disk-drive -- therefor.

Column 2, line 12, delete "harddisk" and insert -- hard-disk -- therefor.

Signed and Sealed this

Seventh Day of May, 1991

Attest:

HARRY F. MANBECK, JR.

*Attesting Officer*　　　*Commissioner of Patents and Trademarks*